United States Patent
Mösli et al.

(10) Patent No.: US 11,766,808 B2
(45) Date of Patent: Sep. 26, 2023

(54) MELTER FOR PREPARING A MOLTEN MEDIUM

(71) Applicant: Robatech AG, Muri (CH)

(72) Inventors: Urs Mösli, Winterthur (CH); Martin Klinkert, Arni (CH)

(73) Assignee: ROBATECH AG, Muri (CH)

( * ) Notice: Subject to any disclaimer, the term of this patent is extended or adjusted under 35 U.S.C. 154(b) by 0 days.

(21) Appl. No.: 17/580,523

(22) Filed: Jan. 20, 2022

(65) Prior Publication Data

US 2022/0234253 A1 Jul. 28, 2022

(30) Foreign Application Priority Data

Jan. 22, 2021 (EP) ..................................... 21153017

(51) Int. Cl.
*B29B 13/02* (2006.01)
*B05C 11/10* (2006.01)
*B29K 105/00* (2006.01)

(52) U.S. Cl.
CPC ........ *B29B 13/022* (2013.01); *B05C 11/1042* (2013.01); *B29K 2105/0097* (2013.01)

(58) Field of Classification Search
CPC .............. B29B 13/022; B05C 11/1042; B29K 2105/0097; B01J 6/005
See application file for complete search history.

(56) References Cited

U.S. PATENT DOCUMENTS

| | | |
|---|---|---|
| 4,485,941 A | 12/1984 | Frates et al. |
| 4,771,920 A | 9/1988 | Boccagno et al. |
| 4,821,922 A * | 4/1989 | Miller ................ G01G 17/04 177/184 |
| 5,919,384 A | 7/1999 | Reifenberger et al. |
| 6,433,315 B2 | 8/2002 | Reifenberger et al. |
| 2001/0009752 A1 | 7/2001 | Reifenberger et al. |
| 2014/0144523 A1 * | 5/2014 | Ganzer ................ B29B 13/022 137/334 |

FOREIGN PATENT DOCUMENTS

| | | |
|---|---|---|
| EP | 0 076 057 A1 | 4/1983 |
| EP | 0 353 792 A2 | 2/1990 |
| EP | 0 872 284 A2 | 10/1998 |

OTHER PUBLICATIONS

Europäisches Patentamt (European Patent Office), Europäischer Recherchenbericht (European Search Report), dated Jun. 10, 2021 (Jun. 10, 2021), 2 pages, European Patent Office, München, Germany (DE).

* cited by examiner

Primary Examiner — Vishal Pancholi
(74) Attorney, Agent, or Firm — CHRISTOPHER C. DREMANN, P.C.; Christopher C. Dremann

(57) ABSTRACT

A melter for preparing a molten medium, in particular for preparing a molten adhesive, has a melting tank that has a melting chamber for receiving and melting a medium to be melted. The melter has a heating device for heating the melting chamber. The melting chamber has an upper chamber section and a lower chamber section. The melting tank has a dispensing opening that can be fluidly connected to a delivery device for delivering the molten medium. The melting tank further has a drain opening. The dispensing opening and the drain opening open into the lower chamber section. The melter further has a closure body for closing the drain opening. In a closed position, the closure body closes the drain opening and an end section of the closure body projects into the lower chamber section.

20 Claims, 4 Drawing Sheets

MELTER FOR PREPARING A MOLTEN MEDIUM

FIELD OF THE INVENTION

The present invention relates to a melter for preparing a molten medium, in particular for preparing a molten adhesive.

BACKGROUND OF THE INVENTION AND RELATED ART

In a wide variety of industries, hot-melt adhesives are used to connect parts to one another. Before processing, adhesives of this type must be converted from the solid state to a liquid or pasty (viscous) state by the action of heat. This is accomplished by melters.

The medium to be melted can be present, for example, in the form of granules, pellets, blocks or sticks.

Melters for preparing a molten medium, in particular melters for preparing a molten adhesive, typically have a housing and a melting tank formed within the housing. The melting tank is used to melt the medium to be melted, wherein the melting tank can generally be heated by means of an electric heater. In order to feed the medium to be melted to the melter, namely to the melting tank, the melter has a filling opening. Via this filling opening, the medium is fed in solid form to the melting tank. This can be done manually.

In melters for melting solid hot-melt adhesives, the melting of the hot-melt adhesive present in the solid state is generally carried out in a melting tank, wherein this solid hot-melt adhesive is heated in the melting tank until it is in liquefied form. This molten adhesive can then be delivered to a consumer, for example a dispensing device, by means of a delivery device, for example a pump. Heat transfer from the melting tank to the adhesive to be melted takes place essentially via contact points between the melting tank and the solid hot-melt adhesive, and thus via the walls of the melting tank. Even already liquefied adhesive transfers heat to the still solid adhesive, but this type of heat transfer or melting is less efficient than with direct contact between the solid hot-melt adhesive and the wall. In order to achieve the best possible heat transfer and thus particularly good or rapid melting of the hot-melt adhesive, the walls are therefore equipped with ribs, particularly in the lower part of the melting tank, in which the fluid connection to the delivery device is typically located. The critical factor in the use of melters is, in particular, the process for switching on the melter. The requirement for a melter is to ensure that the melting tank is ready for use as quickly as possible after switching on, thus ensuring that molten adhesive is present, particularly in the region of an intake opening or dispensing opening leading to the delivery device, for example a feed pump, in a quantity sufficient to prevent incompletely melted adhesive from getting into the delivery device and from there into the dispensing device since this can lead to damage to the delivery device and/or to the dispensing device. For this purpose, ribs for good heat transfer are usually provided in the vicinity of the intake point or dispensing opening. The performance of melters depends, inter alia, on these ribs in the vicinity of the dispensing opening or intake point since, when the required melting capacity is very high and adhesive consumption is very high, a reliably liquefied hot-melt adhesive in the region of the dispensing opening is one of the limiting factors with regard to the maximum delivery rate. However, the formation of ribs in the region of the intake point or dispensing opening is associated with various disadvantages, particularly with regard to emptying and cleaning of the melting tank.

Depending on the use and application of the melter, it may be necessary for different hot-melt adhesives to be processed. This means that when production is switched over, the previously used hot-melt adhesive must be removed from the melter as completely as possible. Furthermore, it is also necessary from time to time to clean the melting tank from impurities which have gotten into the interior of the melting tank, e.g. burnt adhesive, dirt that has penetrated from the outside, lumps and the like. Moreover, the use of hot-melt adhesives results in contamination of the melting tank. Especially in applications with low adhesive consumption and with relatively long interruptions in operation, the adhesive undergoes aging. For example, adhesive vapors condense in the vicinity of the filling opening of the melting tank and, as a result, cover surfaces of the melting tank and the melter. Adhesive which adheres to the walls of the melter or to walls of the melting tank remains there even when solid adhesive is added. This layer undergoes particularly severe aging as a result of the thermal stress and may burn as a result of the action of oxygen. Reactive adhesive, such as, for example, PUR (polyurethane reactive adhesives), may cure as a result of the influence of atmospheric moisture. During operation, therefore, an undesirable crust of aged or cured and burnt adhesive is formed, impairing heat transfer. Furthermore, there is the risk that parts of this aged or cured adhesive will reach the interior of the melting tank and from there will reach the region of the intake opening or dispensing opening leading to the delivery device. During the cleaning of the melting tank, this layer or crust is typically detached mechanically from the wall and thus gets into the interior of the melting tank in the form of loose fragments. These loose, solid constituents must be removed in order to avoid damage to the feed pump and/or the dispensing device and/or blocking of a filter.

Owing to the design of typical melting tanks, particularly those with ribs, particularly with ribs in the region of the intake opening, the cleaning of the melting tanks is very complicated. Particularly in the case of relatively large, solid constituents which have got into the interior of the melting tank, it is often not possible to empty the melting tank by means of the delivery device, especially if the dispensing opening of the melting tank and/or channels of the delivery device have relatively small cross sections. In the case of larger or coarser impurities, it may even be necessary to remove the melting tank from the melter and to empty it manually. One problem with such emptying, for example by means of tilting, is that projections and undercuts are formed, owing to the ribs for example, and these prevent simple emptying. Owing to the ribs, particularly owing to ribs in the region of the intake or dispensing opening, it is only with difficulty that impurities can be removed with cleaning tools, in particular that impurities can be completely removed in the region of the intake opening or dispensing opening. Cleaning of the melting tank from the filling opening is also problematic owing to ribs and undercuts. Cleaning known melting tanks is therefore associated with a considerable expenditure of time and frequently leads only to unsatisfactory results. When production is restarted, the impurities remaining in the melting tank have the tendency to rapidly clog an adhesive filter or to damage or impair the functioning of subsequent components, such as delivery units or delivery devices or metering devices.

For melters for melting a medium other than an adhesive, the above and following statements apply analogously.

EP 0 076 057 A1 discloses a device for melting and dispensing a thermoplastic material, this device having a melting tank for melting the thermoplastic material. The melting tank has a drain hole for emptying the melting tank. This drain hole has a thread, wherein the drain hole is closed by means of a drain plug, wherein for this purpose the drain plug is screwed into a drain plug adapter, wherein this drain plug adapter is, in turn, screwed into the thread of the drain hole.

EP 0 353 792 A2 discloses a device for melting and dispensing a thermoplastic material, this device having a melting tank, wherein the melting tank has a drain for draining the molten material, this drain being closed by means of a plug.

Although the two abovementioned documents allow liquefied medium to be discharged from the drain opening for the purpose of emptying the melting tank, there is still the problem of making it possible for the medium to be heated up as quickly as possible or for it to be melted reliably in the region of the intake opening or the dispensing opening of the melting tank leading to the delivery device, while nevertheless enabling the melting tank to be cleaned as simply as possible in this region.

OBJECT OF THE INVENTION

It is therefore the object of the present invention to provide a melter for preparing a molten medium which overcomes the abovementioned disadvantages.

This object is achieved by means of a melter which has the features described herein and illustrated by the accompanying drawing figures.

SUMMARY OF THE INVENTION

The melter according to the invention is used to prepare a molten medium, in particular to prepare a molten adhesive. For this purpose, the melter has a melting tank, wherein the melting tank has a melting chamber for receiving and melting the medium to be melted. The medium to be melted is preferably present in the form of granules, pellets, blocks or sticks. The melter has a heating device for heating the melting chamber. This heating device can be, for example, an electric heating device. The melting chamber has an upper chamber section and a lower chamber section. The melting tank furthermore has a dispensing opening, wherein the dispensing opening can be fluidly connected to a delivery device for delivering molten medium. The dispensing opening can be designed, for example, as a channel, in particular as an intake channel, or as an intake nozzle. The delivery device can be, for example, a feed pump, in particular a piston pump or gear pump. The delivery device need not necessarily be connectable or connected directly to the dispensing opening. Thus, it is quite conceivable for further components, such as, for example, a distributor, intermediate pieces or adapters, to be arranged between the dispensing opening and the delivery device. To empty the melting tank, in particular without having to deliver molten medium through the dispensing opening, the melting tank has a drain opening. Both the dispensing opening and the drain opening open into the lower chamber section. Arranging the drain opening and the dispensing opening in this way has the advantage that, owing to gravity, molten adhesive or molten medium flows from the upper chamber section into the lower chamber section and thus accumulates there or flows from the upper chamber section into the lower chamber section and thus in the direction of the dispensing opening or in the direction of the drain opening. The melter has a closure body for closing the drain opening, wherein, in a closed position of the closure body, in which the closure body closes the drain opening, an end section of the closure body projects into the lower chamber section.

The configuration of the closure body with an end section which projects into the lower chamber section has the advantage that the volume available for the molten adhesive or the molten medium in the lower chamber section is reduced. This has the advantage that, owing to the smaller volume, when the melter is switched on, the medium located in the region of the lower chamber section is melted more quickly since, on the one hand, the volume to be melted is reduced and, furthermore, a ratio of the area which makes contact with the heated walls of the melting tank to the volume of the medium to be melted in the lower chamber section is increased. Production can thus start earlier. Thus, the end section of the closure body, which projects into the lower chamber section, as it were takes over the task which otherwise falls to ribs formed in the region of the lower chamber section. The particular advantage now consists in the fact that these structures, which serve for better, in particular faster, heating of the medium, are formed on the closure body, thus making it possible to dispense with ribs formed on the melting tank for the purpose of heat transfer, which ribs typically lead to an angled geometry which makes it difficult to clean the lower chamber section. Since the structure taking over the task of the ribs, namely the end section of the closure body, is a component of the closure body, emptying and/or cleaning of the melting tank is made easier. When the closure body is removed from the drain opening, for example for the purpose of draining the molten medium, the end section is also removed from the lower chamber section. As a result, the end section, in contrast to ribs, does not hinder emptying. Furthermore, cleaning of the lower chamber section is also easier since, when cleaning is carried out, the end section, in contrast to ribs, does not make access to the lower chamber section more difficult, it being possible, for example, to introduce cleaning tools into the lower chamber section through the drain opening without problems. Despite a possible omission or reduction of ribs, a high melting capacity is ensured since the end section of the closure body can, as it were, take over the task of the ribs or at least partially compensate for the absence of ribs.

In connection with drainage of the medium and, in particular, cleaning of the lower chamber section or of the melting tank as such, it is regarded as particularly advantageous if the closure body can be removed completely from the drain opening. As a result, the lower chamber section is particularly easily accessible from the drain opening, e.g. in order to introduce a cleaning tool into the lower chamber section.

The drain opening is preferably larger than the dispensing opening. This makes it easier to empty and clean the melting tank via the drain opening. In particular, a ratio of a cross-sectional area of the drain opening to a cross-sectional area of the dispensing opening is 1.2 to 20, preferably 2 to 8.

The drain opening preferably has a transverse extent, in particular a diameter, of 3 cm to 10 cm. The dispensing opening preferably has a transverse extent, in particular a diameter, of from 1 cm to 4 cm.

With regard to emptying the melting tank, it is regarded as particularly advantageous if the drain opening is located in the region of the lowest point, in particular at the lowest point of the lower chamber section, or if the drain opening forms the lowest point of the lower chamber section. It is regarded as particularly advantageous if the dispensing opening is likewise located in the region of the lowest point of the lower chamber section.

It is regarded as particularly advantageous if the end section is designed as a spigot and/or as a rib and/or as a shaft and/or rod. It is regarded as particularly advantageous if the end section is of cylindrical design.

It is regarded as particularly advantageous if the end section, in particular the entire closure body, consists of metal and/or an alloy. Since metals or alloys have a particularly good thermal conductivity, heat can additionally be introduced into the lower chamber section by means of the closure body. This can be accomplished, for example, in that the closure body makes direct contact with a heated wall of the melting tank and/or is directly heated by means of the heating device.

The metal is, in particular, aluminum or copper. The alloy is, in particular, an aluminum and/or copper alloy.

It is quite conceivable for the surface of the closure body, which is preferably metallic, to have a coating.

It is regarded as advantageous if, in the closed position of the closure body, the end section is spaced apart from walls of the melting tank which delimit the lower chamber section, and/or ribs of the melting tank. In this configuration, damage to the walls of the melting tank, for example damage to a coating of the walls, is avoided. Furthermore, such a configuration is advantageous with regard to the molten medium flowing as freely as possible. In particular, accumulation of molten medium is avoided.

It is regarded as particularly advantageous if, in the closed position, the end section is spaced apart from all the structures of the melting tank.

With regard to particularly simple cleaning and particularly favorable flow of molten medium, it is regarded as advantageous if, apart from the end section of the closure body, the lower chamber section is free of fittings and/or free of structures projecting into the lower chamber section. In particular, the lower chamber section is free of ribs.

It is regarded as advantageous if the melting tank has a bottom surface which delimits the lower chamber section and slopes downwards in the direction of the drain opening, for example if this bottom surface is inclined at an angle of 1.5° to 3° to a standing plane of the melter.

It is regarded as particularly advantageous if the volume of the lower chamber section is smaller than the volume of the upper chamber section.

It is regarded as particularly advantageous if the lower chamber section is designed as a channel, in particular an elongate channel, which is open in the direction of the upper chamber section, wherein the drain opening opens into the channel at one end of the channel.

The drain opening preferably opens into the channel in a longitudinal direction of the channel.

It is regarded as particularly advantageous if the upper chamber section has one or more passage openings, wherein the one or more passage openings open into the lower chamber section. The passage openings preferably open into a lower chamber section designed as a channel and in this way form a channel which is open in the direction of the upper chamber section.

The lower chamber section is preferably free, or at least free in the outflow direction, of corners and/or edges and/or other projecting geometries, or at least corners, edges and projecting geometries are rounded. The cleaning of the lower chamber section is thereby made easier.

It is regarded as particularly advantageous if the lower chamber section, which is, in particular, designed as a channel, has a constant cross section or a cross section which widens in the direction of the drain opening, at least in the part adjoining the bottom surface, preferably the entire lower chamber section. Such a configuration has proven to be advantageous with regard to cleaning of the melting tank since the introduction of cleaning tools and the accessibility of all points of the lower chamber section by means of a cleaning tool introduced through the drain opening are made easier. This configuration also makes it easier to drain off molten medium.

In particular, provision is made for the lower chamber section to have a longitudinal extent, wherein the end section of the closure body has a longitudinal extent, wherein the longitudinal extent of the end section of the closure body is between 10% and 90%, preferably between 20% and 80%, particularly preferably between 20% and 60%, in particular between 25% and 50%, of the longitudinal extent of the lower chamber section. These length ratios can promote reliable and rapid melting of the solid medium located in the lower chamber section, particularly when the melter is switched on again and/or is first started up.

A longitudinal extent of the end section is preferably 5 cm to 15 cm. A longitudinal extent of the lower chamber section is preferably 6 cm to 30 cm. However, it is also quite conceivable for the longitudinal extent of the lower chamber section to be up to 80 cm.

It is regarded as particularly advantageous if, in the closed position, in a region in which the end section is arranged, the lower chamber section has a transverse extent and the end section of the closure body has a transverse extent, wherein a ratio of the transverse extent of the end section to the transverse extent of the lower chamber section is between 10% and 90%, preferably between 20% and 80%, particularly preferably between 35% and 60%, in particular between 40% and 55%.

It is regarded as particularly advantageous if the end section is arranged concentrically to a longitudinal axis of the lower chamber section in the closed position.

A transverse extent, in particular a diameter, of the end section is preferably 1.5 cm to 4 cm. A transverse extent, in particular a diameter, of the lower chamber section is preferably 3 cm to 10 cm.

The end section and/or the lower chamber section are/is preferably of substantially cylindrical or cylindrical design.

A cross section of the drain opening is preferably greater than or equal to a cross section of the lower chamber section in a region of the lower chamber section adjoining the drain opening. As a result, undercuts, which make it difficult to drain the molten medium or to clean the lower chamber section, are avoided in this region.

It is regarded as particularly advantageous if the dispensing opening and the drain opening open into the lower chamber section on different sides. In particular, the two sides enclose an angle of 85° to 95°, preferably an angle of 90°.

The lower chamber section is preferably of inclined design, wherein the lower chamber section slopes downward from the dispensing opening in the direction of the drain opening. As a result, impurities, which typically have a higher density than the molten medium, accumulate in the region of the drain opening and not in the region of the dispensing opening.

The dispensing opening and the drain opening are preferably formed on different outer sides of the melting tank. In particular, the outer sides enclose an angle of 85° to 95°, preferably of 90°.

The dispensing opening and the drain opening preferably open into the lower chamber section at a distance from one another in the longitudinal direction of the lower chamber section. The distance is preferably less than or equal to a longitudinal extent of the end section.

It is regarded as particularly advantageous if, in the closed position, the end section extends at least as far as the dispensing opening, preferably beyond the dispensing opening. As a result, reliable melting of medium or reliable provision of molten medium in the region of the dispensing opening is promoted.

The melting tank preferably has ribs which project into the melting chamber, the ribs being interrupted in the region of the lower chamber section.

It is regarded as advantageous if the end section has a cavity, in particular if the cavity is accessible from an outer side of the melting tank. The configuration of the end section with a cavity has the advantage that, when the melter is switched on, the temperature required for melting the medium is reached particularly quickly in the region of the end section since a smaller amount of material of the closure body has to be heated. It is also possible, for example, for insulation material to be arranged in the cavity in order to avoid energy losses due to radiation of heat into an outer region. To ensure particularly rapid and particularly reliable heating of the end section, it is quite conceivable to arrange a heating cartridge and/or other heating means in the region of the cavity. It is thereby possible for heat to be introduced in a targeted manner into the region of the lower chamber section, particularly if the end section extends as far as the dispensing opening or beyond it. It is also quite possible for the cavity to be used to accommodate a temperature sensor in order to measure the temperature directly in the region of the lower chamber section. In this case, it is quite conceivable for this temperature sensor to be integrated into a control circuit, wherein the delivery device, for example the feed pump, is started or can be started only when the temperature in the region of the hollow body or of the end section is sufficient. Furthermore, a cavity is also a particularly good way of saving material, with the result that the closure body has a particularly low weight and is therefore particularly easy to handle and can be produced in a favorable manner.

However, it is quite conceivable for the closure body to consist of a solid material.

The end section preferably has a wall thickness of 2 mm to 5 mm. It is also quite conceivable for the entire closure body to have a wall thickness of 2 mm to 5 mm. The end section, in particular the entire closure body, preferably has a constant wall thickness.

The closure body can preferably be inserted, in particular plugged, into the drain opening, preferably by hand. The drain opening and/or the closure body are free of threads and/or other retaining structures, in particular at least in a region which comes into contact with liquid medium. Such threads or retaining structures have the disadvantage that molten medium, in particular adhesive, settles in the region of the thread turns or in the region of the retaining structures and may cure, as a result of which functioning, in particular removal of the closure body, may be impaired. Cleaning of the drain opening and of the closure body is also made more difficult by such structures.

To facilitate drainage of the medium from the lower chamber section through the drain opening and, in particular, to meter the flow of medium during drainage of the medium from the drain opening, it is regarded as advantageous if the closure body has a drain channel. The drain channel is designed in such a way that, in a drainage position of the closure body, typically a position in which the closure body is only partially arranged in the drain opening, in particular, starting from the closed position, is partially pulled out of the drain opening, one end of the drain channel opens into the lower chamber section and another end of the drain channel opens into a region outside the melting tank. The other end of the drain channel is preferably arranged inside the melting tank in the closed position. Thus, in the drainage position, molten adhesive or molten medium can pass through the drain channel into the outer region of the melting tank for the purpose of draining off the molten adhesive or molten medium.

When the adhesive or the medium is drained from the melting tank, the closure body can first of all be transferred into the drainage position in order to drain off the molten adhesive or the molten medium. If only small amounts still flow out through the drain channel or no more medium flows out of the drain channel, the closure body can be removed completely from the drain opening in order to introduce cleaning tools or other items into the lower chamber section. Direct, complete removal of the closure body from the drain opening is problematic, particularly if relatively large amounts of molten medium are still present in the melting tank since a large amount of molten medium then emerges from the drain channel in a short time, and there is therefore the risk that uncontrolled emergence of molten medium will occur, as a result of which, particularly in the case of manual handling of the closure body, there is the risk of burns for the operator due to contact with the molten medium.

As an alternative or in addition, the drain opening can also have a drain channel. The drain channel is designed in such a way that the closure body closes the drain channel in the closed position and, in a drainage position of the closure body, typically a position in which the closure body is only partially arranged in the drain opening, in particular is partially pulled out of the drain opening, the closure body frees the drain channel.

In the drainage position, the end section preferably continues to project into the lower chamber section. Undesired curing of the adhesive when the medium is drained in the region of the lower chamber section adjoining the drain opening is thereby avoided since the end section continues to reduce the accessible volume in this region and can continue to contribute to the heating capacity. This avoids obstruction of the draining of the adhesive through the drain opening.

The closure body preferably has a head section and a stem section adjoining it in the axial direction, wherein the end section projecting into the lower chamber section is formed by the stem section, and the head section projects in a radial direction with respect to the stem section.

The closure body preferably has a contact section, wherein the closure body rests flat against the melting tank by means of the contact section in the closed position. This promotes particularly good heat transfer from the melting tank, in particular a wall of the melting tank, to the closure body. In order to simplify release of the closure body from the melting tank, it is quite conceivable for the contact section to have one or more shaped portions for the insertion of a tool between the contact section and the melting tank. These shaped portions can be designed as pockets, for example. The tool can be a screwdriver, for example.

It is regarded as advantageous if the closure body has a further section, which adjoins the end section, wherein the further section has a bottom surface which faces the lower chamber section and a side surface which adjoins the bottom surface. The side surface is preferably designed as a circumferential surface.

The further section is preferably of substantially pot-shaped design.

It is regarded as advantageous if, in relation to a longitudinal axis of the closure body, the further section projects in a radial direction with respect to the end section.

In the closed position, the further section is preferably arranged in the drain opening.

In an advantageous embodiment, the further section has a guide structure, and the melting tank has, in the region of the drain opening, a counter-structure interacting with the guide structure. In particular, the guide structure and the counter-structure are designed to be parallel. The guide structure and the counter-structure facilitate positioning or alignment and movement of the closure body in the drain opening since the guide structure and the counter-structure guide the closure body in the longitudinal direction.

The further section preferably has a radial projection for positioning a seal, in particular a sealing ring.

The melter preferably has a seal, which is arranged in the region of the drain opening and interacts with the closure body, for closing the drain opening in a leak tight manner. In particular, the seal is designed as a sealing ring or flat gasket. The closure body preferably passes through the sealing ring or the flat gasket, wherein the closure body has a sealing surface, wherein the seal makes contact with the sealing surface both in the closed position and in the drainage position. This ensures that molten medium can only escape through the drain channel in the drainage position. Preferably, a side surface of the further section forms the sealing surface. Preferably, the seal acts as a radial seal. However, it is also conceivable for the seal to act as an axial seal.

The seal can preferably be inserted into the drain opening from an outer side of the melting tank. It is also quite conceivable for the seal to first be mounted on the closure body and to be inserted together with the closure body into the drain opening.

To facilitate cleaning of the lower chamber section and as complete as possible removal of molten medium and any impurities from the lower chamber section, it is regarded as advantageous if the drain opening widens outward, in particular widens outward in one or more steps. It is quite possible for one of the steps to serve as a contact surface for the seal.

The further section of the closure body preferably has a bottom surface, which faces the lower chamber section, and a side surface, which adjoins the bottom surface, wherein the drain channel extends from the bottom surface to the side surface. In particular, the drain channel is formed by a depression of the further section, for example a recess or an offset or an impression. The side surface is preferably designed as a circumferential surface.

If the drain channel is formed in the region of the drain opening, it can likewise be designed as a depression, for example as a recess or as an offset or as an impression.

With regard to particularly simple drainage of the molten medium from the drain opening, it is regarded as advantageous if the melter has a guide body, for example a guide plate, which can be arranged below the drain opening, to guide away material emerging from the drain opening. The guide body is preferably heatable and/or the guide body makes direct contact with a heated wall of the melting tank. The guide body is preferably designed as an insert.

In particular, the guide body is manufactured from a metal or a metal alloy. The guide body is preferably designed as a groove.

The closure body preferably has a connecting section, in particular a connecting flange, wherein the closure body is connected to the melting tank by means of separate connecting means. It is quite possible for the connecting section to be formed by the contact section. The connecting flange can have openings, for example bores, wherein the connecting means pass through these openings. The connecting means are preferably screws, which can be screwed into a wall of the melting tank. The connecting means may also be threaded rods with nuts, which rods are connected to the melting tank, wherein the threaded rods pass through the connecting section.

The melter preferably has guide means for axially guiding the closure body during the transfer of the closure body from the drainage position to the closed position and vice versa.

It is quite conceivable for the connecting means to form the guide means. It is conceivable, for example, for the connecting means, which are designed as screws, to be partially unscrewed or for the nuts to be loosened to enable the closure body to be transferred from the closed position to the drainage position. The partial unscrewing/loosening has the advantage that the screws or threaded rods on the one hand form a guide for the closure body for the purpose of transfer from the closed position to the drainage position. In addition, the partially unscrewed screws or the partially loosened nuts also form a stop for the closure body, and therefore the position of the closure body can be adjusted particularly finely, and unintentional complete release of the closure body from the drain opening is avoided.

The drain opening and/or the end section are preferably formed coaxially with a longitudinal axis of the lower chamber section. In particular, the lower chamber section is free of projections and undercuts.

It is regarded as particularly advantageous if, at least in the part adjoining the bottom surface, the entirety of the lower chamber section and drain opening has a constant cross section or a cross section which widens in the direction of the drain opening. It is quite possible for the widening of the cross section to take place in one or more steps.

In particular, a bottom surface of the lower chamber section is free of projections or depressions.

The closure body and/or the melting tank are preferably of one-piece design.

The closure body is preferably forged, in particular forged from an aluminum alloy.

However, it is also quite possible for the closure body to be a deep-drawn part.

The melting tank is preferably a casting, in particular an aluminum casting. The lower chamber section and the drain opening, which opens into the lower chamber section, are preferably formed by using a casting core during the casting process for the melting tank.

The melting tank or the method for the production thereof is, in particular, permanent mold casting or a permanent mold casting method. The material of the melting tank is, in particular, aluminum or an aluminum alloy.

The drain opening has also proven to be particularly advantageous in the case of a casting method for producing the melting tank since the drain opening makes it particularly easy to remove the casting core which can be used to form the lower chamber section. In the production of the melting tank, it is quite possible to use a sand core, a salt core or a metal core to form the drain opening and the lower chamber section. It is preferable to use a metal core, in particular a metal core which is removed, in particular pulled, through the drain opening after the melting tank has hardened and before the mold is opened.

The melting tank is preferably coated at least on the inside, preferably with an FE P (fluorinated ethylene propylene, in particular tetrafluoroethylene-hexafluoropropylene copolymer) coating.

The melting tank is preferably jacketed with an insulating material around the circumference. The insulating material is, in particular, rock wool or an insulating material which contains an aerogel. The jacket is preferably between 10 mm and 30 mm thick.

The closure body is preferably arranged within the jacket.

The lower chamber section preferably has a smooth and/or rounded side and bottom surface.

The melter preferably has a housing, wherein the melting tank is formed within the housing.

In order to feed the medium to be melted to the melter, namely to the melting tank, the melter preferably has a filling opening. Via this filling opening, the medium is fed in solid form to the melting tank. This can be done manually.

It is quite possible for the melter according to the invention to be part of another device or of a system.

It is also quite possible for the melter according to the invention to have further components, such as, for example, a delivery device, in particular a feed pump, for delivering the molten medium. Furthermore, the melter can also have a distributor for discharging molten medium into at least one line which can be connected to the distributor.

BRIEF DESCRIPTION OF THE DRAWINGS

The invention is described in greater detail by means of an exemplary embodiment illustrated in the accompanying drawing figures without being restricted thereto.

DETAILED DESCRIPTION OF THE INVENTION

Figure 1:
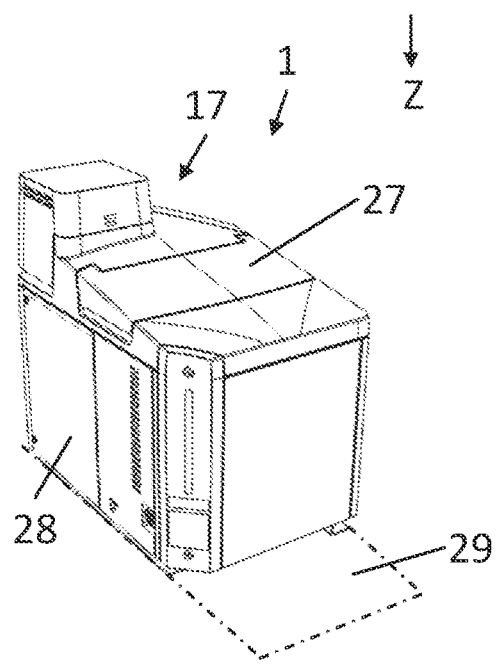
FIG. 1 shows a melter according to the invention in a perspective view.
Figure 2:
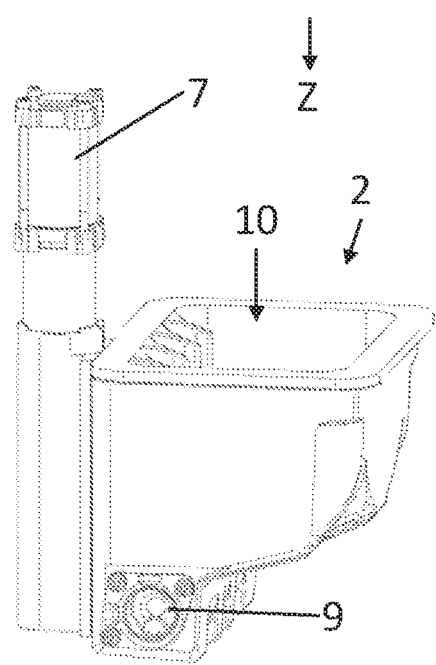
FIG. 2 shows a perspective view of an arrangement of a melting tank and a delivery device of the melter according to FIG. 1.

FIG. 1 shows a melter 1 for preparing a molten medium, in the present case for preparing a molten adhesive. As shown in FIGS. 1-4, the melter 1 has a melting tank 2 arranged within a housing 17 and a delivery device 7 for delivering the molten adhesive. The melting tank 2 has a melting chamber 3 for receiving and melting the adhesive to be melted. For this purpose, the melting chamber 3 can be charged with solid adhesive, it being possible for this solid adhesive to be present in the form of adhesive granules and/or adhesive pellets, for example.

The melting tank 2, to be more precise the melting chamber 3 of the melting tank 2, is filled through a filling opening 10 formed in the upper region of the melting tank 2, the melting tank 2 being filled in the Z direction in the present case. The melting tank 2 is preferably filled manually. However, it is also quite conceivable for the melting tank 2 to be filled in an automated manner. In the present embodiment, the filling opening 10 of the melting tank 2 is closed by a cover 27 of the housing 17. This cover 27 can be opened for the purpose of filling the melting tank 2.

Figure 5:
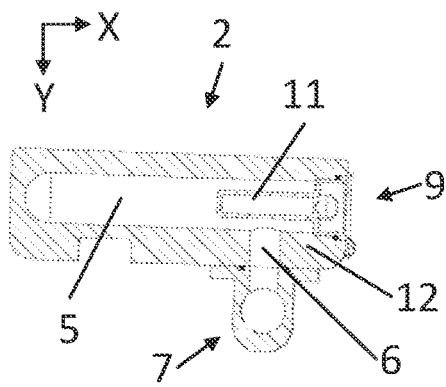
FIG. 5 shows the arrangement according to FIG. 2 in another sectional view.

In the present case, as shown in FIG. 5, the melting tank 2 is formed in one piece and as an aluminum casting, wherein walls 12 of the melting tank 2 delimit the melting chamber 3. The melter 1 has a heating device (not illustrated specifically) for heating the melting chamber 3 in a known manner. The heating device can be designed as an electric heating device, for example. The heating device is preferably configured in such a way that this heating device has heating elements, in particular heating wires, which rest against the outside of the walls 12 of the melting tank 2. In particular, the walls 12 have receptacles in which the heating elements are arranged. Thus, in the present case, the melting chamber 3 and the adhesive to be melted situated therein are heated via the heated walls 12 of the melting tank 2, the melting tank 2 having a plurality of ribs 18 which project into the melting chamber 3 for the purpose of better heat transfer and faster heating of the adhesive.

Figure 3:
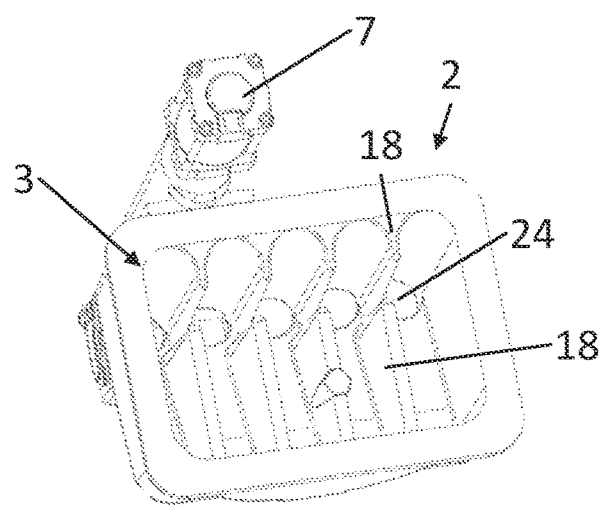
FIG. 3 shows the arrangement according to FIG. 2 in another perspective view.
Figure 4:
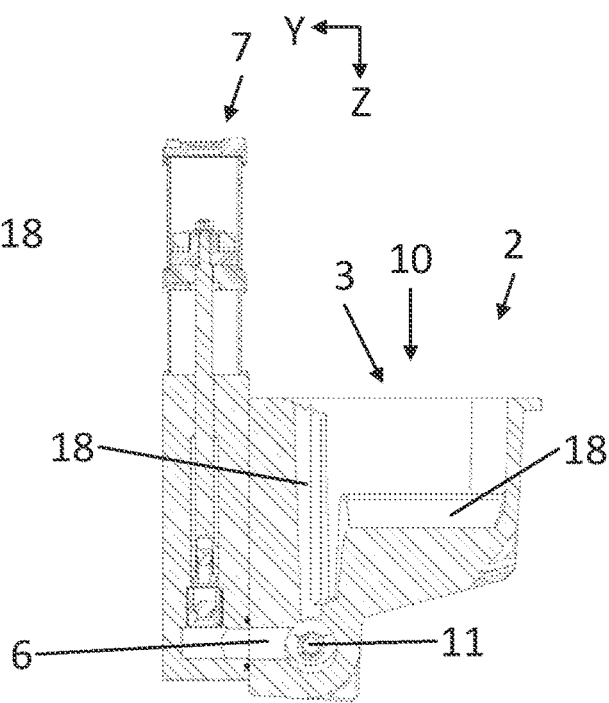
FIG. 4 shows the arrangement according to FIG. 2 in a sectional view.
Figure 6:
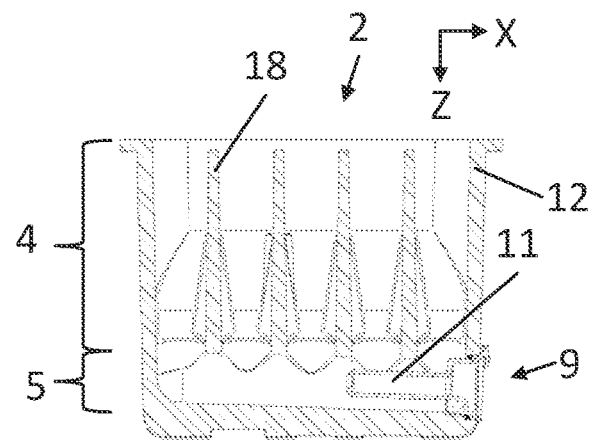
FIG. 6 shows an arrangement of the melting tank according to FIG. 2 and a closure body in a closed position in a sectional view.
Figure 7:
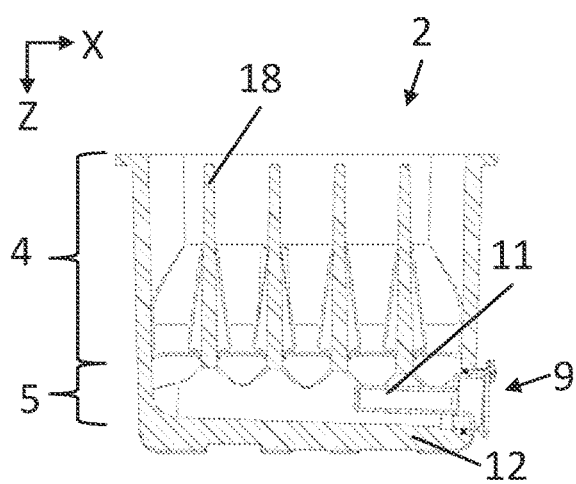
FIG. 7 shows the arrangement according to FIG. 6 with the closure body in a drainage position in a sectional view.
Figure 8:
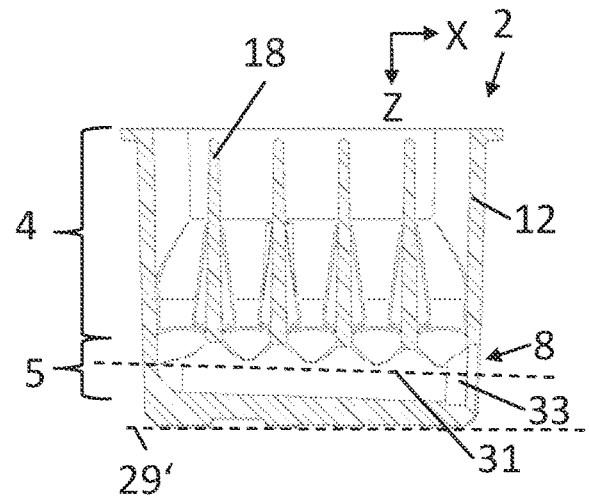
FIG. 8 shows the arrangement according to FIG. 6 without the closure body.
Figure 11:
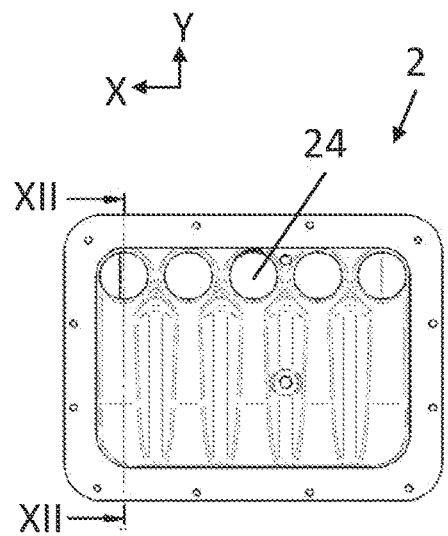
FIG. 11 shows the melting tank according to FIG. 12 in a view according to the arrow XI in FIG. 12.

As shown especially in FIGS. 6 to 8, the melting chamber 3 has an upper chamber section 4 and a lower chamber section 5 adjoining the upper chamber section 4 in the Z direction, wherein the two chamber sections 4, 5 are fluidly connected to one another by passage openings 24 (FIGS. 3, 11). In the present case, the lower chamber section 5 has a much smaller volume than the upper chamber section 4.

The melting tank 2 has a dispensing opening 6 (FIGS. 4, 5) and a drain opening 8 (FIG. 8), wherein, in the present case, the dispensing opening 6 is designed as an intake channel and has a smaller cross section than the drain opening 8. The dispensing opening 6 is fluidly connected to the delivery device 7 for delivering the molten medium (see FIG. 4). Molten adhesive can thus be drawn in by means of the delivery device 7 through the dispensing opening 6 and delivered to a consumer, e.g. a dispensing device, in particular an application head. The drain opening 8 is used, in particular, for emptying the melting chamber 3 and, for this purpose, is formed at the lowest point of the melting chamber 3 or at the lowest point of the lower chamber section 5 (see FIG. 8).

Both the dispensing opening 6 and the drain opening 8 open into the lower chamber section 5. In order to close the drain opening 8, which is closed during normal operation of the melter 1, the melter 1 has a closure body 9 for closing the drain opening 8. In a closed position, which is illustrated, for example, in FIG. 6, the closure body 9 closes the drain opening 8.

In the present case, the dispensing opening 6 and the drain opening 8 open into the lower chamber section 5 on different sides, wherein the two sides or the dispensing opening 6 and the drain opening 8 enclose an angle of 90° (see FIG. 5). In the present case, the drain opening 8 opens into the lower chamber section 5 in a longitudinal direction of the lower chamber section 5. In contrast, the dispensing opening 6 opens laterally into the lower chamber section 5. A bottom surface of the lower chamber section 5 is free of any openings.

As can be seen especially from FIGS. 5 and 6, the closure body 9 has an end section 11, wherein this end section 11 projects into the lower chamber section 5, wherein the end section 11 extends beyond the dispensing opening 6 in the closed position.

Figure 13:
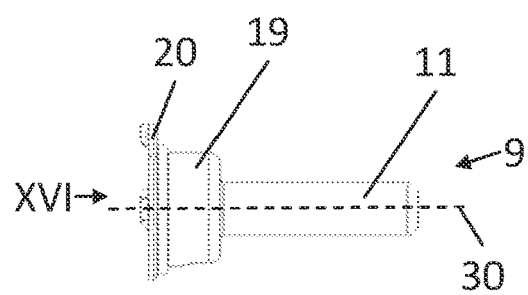
FIG. 13 shows the closure body in a view according to the arrow XIII in FIG. 16.
Figure 14:
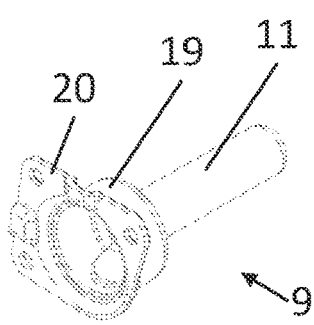
FIG. 14 shows the closure body according to FIG. 13 in a perspective view.
Figure 15:
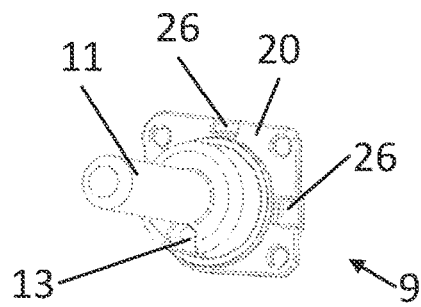
FIG. 15 shows the closure body according to FIG. 13 in another perspective view.

In the present case, the lower chamber section 5 is designed as a channel, wherein in the present case the channel is of essentially circular cylindrical design, wherein an end of the channel which is remote from the drain opening 8 is rounded. The end section 11 of the closure body 9 is likewise of substantially circular cylindrical design. The end section 11 has a longitudinal axis 30 (FIG. 13), wherein the longitudinal axis 30 of the end section 11 and a longitudinal axis 31 (FIG. 8) of the lower chamber section 5 coincide in the closed position, and thus the end section 11 and the lower chamber section 5 are arranged concentrically in the closed position of the closure body 9.

Figure 9:
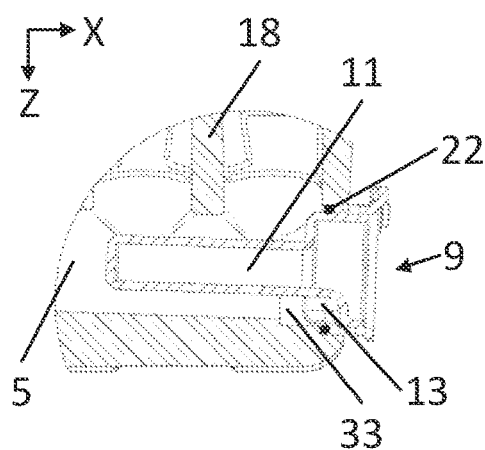
FIG. 9 shows a partial area of FIG. 7.

In the present case, the entirety of the lower chamber section 5 and drain opening 8 has a cross section which widens in the direction of the drain opening 8, wherein the cross section widens along two steps in the region of the drain opening 8. The closure body 9 has counter-structures corresponding to these steps, these counter-structures being formed in the region of a further section 19 (FIGS. 13, 14, 17, 18) adjoining the end section 11. The further section 19 is of substantially pot-shaped design and has a bottom surface 14 (FIG. 17), which faces or is to be made to face the lower chamber section 5, and an encircling side surface 15 (FIG. 17), which adjoins the bottom surface 14. A seal 22 (FIG. 9) is designed as a sealing ring, wherein the closure body 9 passes through the sealing ring. In the present case, the seal 22 is pressed in the radial direction and thus acts as a radial seal. The further section 19 has a radial projection in the form of a step, this step serving to position the seal 22.

Figure 12:
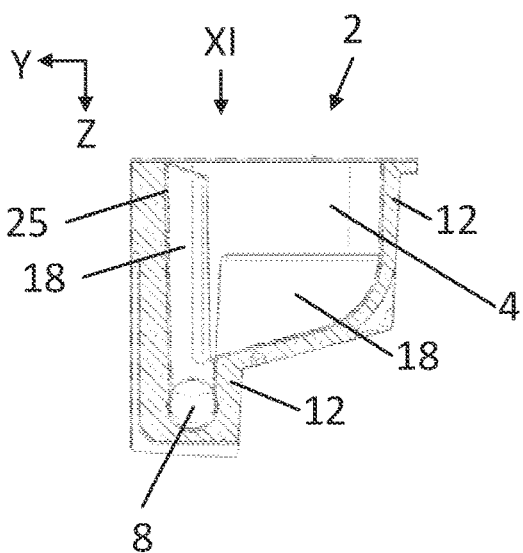
FIG. 12 shows the melting tank in a sectional view according to the arrows XII-XII in FIG. 11.

In the closed position, the end section 11 is spaced apart from walls 12 of the melting tank 2 which delimit the lower chamber section 5, and from the ribs 18 of the melting tank 2. In the present case, the end section 11 is spaced apart from all the structures of the melting tank 2 in the closed position. In this way, damage to the melting tank 2, for example damage to a coating 25 (FIG. 12) applied to the inside of the wall 12 and the ribs 18, is avoided.

To ensure good heat conduction of the closure body 9, the closure body 9 is in the present case manufactured in one piece and from a metal. In the present case, the closure body 9 is a forged part made of an aluminum alloy.

Figure 16:
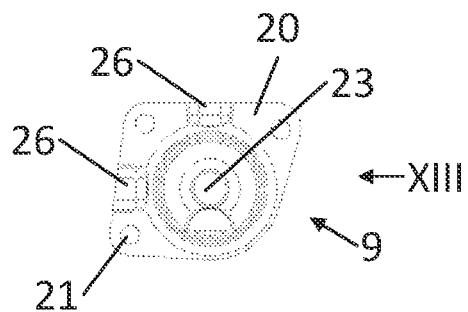
FIG. 16 shows the closure body in a view according to the arrow XVI in FIG. 13.

The closure body 9 has a contact section 20 (FIGS. 13-18), wherein the further section 19 is formed between the end section 11 and the contact section 20. In the closed position, the closure body 9 rests directly and flat against the melting tank 2 by means of the contact section 20, namely against a lateral wall 12 of the melting tank 2. This ensures particularly good heat transfer from the heated wall 12 of the melting tank 2 to the closure body 9 and thus to the end section 11. In the present case, the contact section 20 has three bores 21 (FIG. 16), wherein the bores 21 serve to receive connecting means 32 (FIG. 10), in the present case screws. The screws can be screwed into the wall 12 of the melting tank 2.

In the present case, the lower chamber section 5, apart from the end section 11 of the closure body 9, is free of fittings and free of structures projecting into the lower chamber section 5. In particular, the ribs 18 of the melting tank 2 are interrupted in the region of the lower chamber section 5 and are thus formed only in the upper chamber section 4.

As can be seen, in particular, from FIG. 8 and the longitudinal axis 31, shown in FIG. 8, of the lower chamber section 5, the melting tank 2 has a bottom surface which slopes downward in the direction of the drain opening 8. Specifically, the entire lower chamber section 5 is designed to be inclined with respect to a set-up plane 29 (FIG. 1) of the melter 1 or with respect to a plane 29' which is shown in FIG. 8 and is parallel to the set-up plane 29, wherein the inclination in the present case is approximately 2°.

As can be seen in particular from FIG. 5, the lower chamber section 5 has a longitudinal extent and the end section 11 of the closure body has a longitudinal extent, wherein a ratio of the longitudinal extent of the end section 11 to the longitudinal extent of the lower chamber section 5 is approximately 0.35.

In the present case, a ratio of a diameter of the end section 11 to a diameter of the lower chamber section 5 is about 0.5. In the intake region of the delivery device 7, and thus in a region of the lower chamber section 5 which adjoins the dispensing opening 6, the volume of the adhesive is thus considerably reduced by the end section 11, and therefore particularly rapid heating and thus liquefaction of the adhesive in this region can be achieved.

To drain molten adhesive from the drain opening 8 without completely removing the closure body 9 from the drain opening 8, the closure body 9 has a drain channel 13 (FIGS. 9, 17, 18), wherein, in a drainage position of the closure body 9, one end of the drain channel 13 opens into the lower chamber section 5 and another end of the drain channel 13 opens into a region outside the melting tank 2. The drainage position of the closure body 9 is illustrated in more detail in FIGS. 7, 9 and 10. In this drainage position, the closure body 9 is partially pulled out of the drain opening 8 and in this way makes it possible to slowly drain molten adhesive through the drain channel 13 since a small defined opening, namely the drain channel 13, is exposed. In the closed position, in contrast, the other end of the drain channel 13 is arranged inside the melting tank 2, and therefore no adhesive can escape through the drain channel 13. Complete removal of the closure body 9 can take place when the outflow of adhesive through the drain channel 13 dries up (slows considerably or stops). Then there is no longer the risk of burning or scalding of the operating personnel when the closure body 9 is completely removed.

Figure 17:
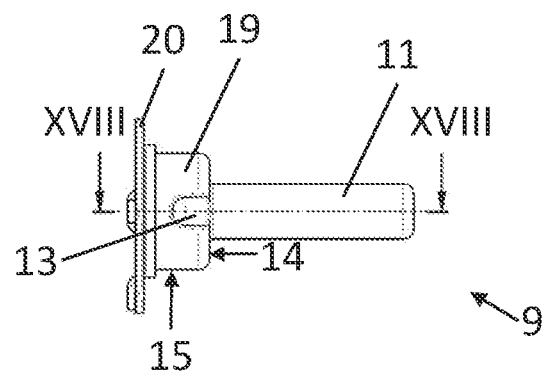
FIG. 17 shows the closure body in a view according to the arrow XVII in FIG. 18.
Figure 18:
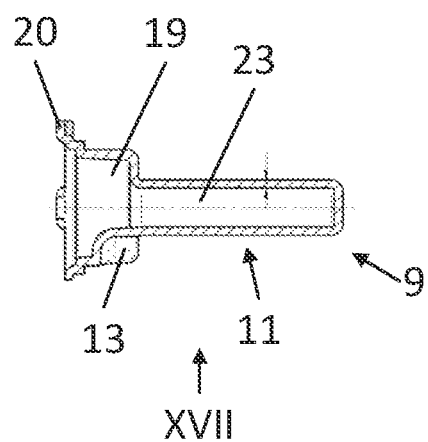
FIG. 18 shows the closure body in a sectional view according to the line XVIII-XVIII in FIG. 17.

As can be seen, in particular, from FIGS. 17 and 18, the drain channel 13 is in the present case formed by a depression in the region of the further section 19.

The drainage position is also to be regarded as advantageous inasmuch as the end section 11 continues to project into the lower chamber section 5 in the drainage position and thus continues to reduce the volume of the lower chamber section 5 which is accessible to adhesive, and furthermore continues to contribute to the heating capacity or to the heating of the adhesive in this region. In this case, it is advantageous that the further section 19 also transmits the heat well and makes contact with the heated wall 12 in the drainage position or is at least only slightly spaced apart from the latter. Unwanted curing of the adhesive in the region of the lower chamber section 5 adjoining the drain opening 8 while the adhesive is being drained is thereby avoided. This avoids obstruction of the draining of the adhesive through the drain opening 8.

Figure 10:
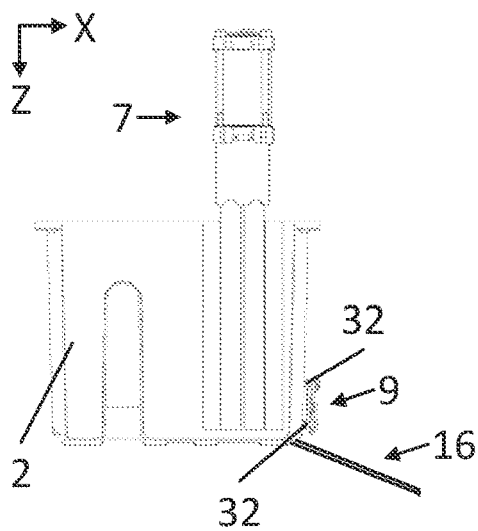
FIG. 10 shows the arrangement according to FIG. 2 with the closure body in the drainage position.

FIG. 10 illustrates in more detail the process of draining the adhesive with the closure body 9 in the drainage position. Arranged below the drain opening 8 is a guide body 16 in the form of a guide plate, which serves to guide away material emerging from the drain opening 8. In the present case, the guide body 16 is manufactured from a metal and makes direct contact with a wall 12 of the melting tank 2. As a result of this direct contact and the good thermal conductivity of the metal of the guide body 16, the guide body 16 is also heated, thus avoiding curing of adhesive on the guide body 16.

To enable the closure body 9 to be transferred from the closed position to the drainage position and vice versa and to prevent the closure body 9 from being pulled completely out of the drain opening 8 during this transfer, the connecting means 32 can be partially screwed out of the wall 12 of the melting tank 2. In this unscrewed position, the closure body 9 can be partially pulled out of the drain opening 8 in order to transfer it from the closed position to the drainage position without there being the risk that the closure body 9 will be completely released from the drain opening 8 and adhesive will emerge from the drain opening 8 in an uncontrolled manner. To facilitate the withdrawal of the closure body 9 from the drain opening 8, the closure body 9 has, in the region of the contact section 20, shaped portions 26 (FIGS. 15, 16) for the insertion of a tool between the contact section 20 and the melting tank 2. For example, a screwdriver can be inserted into the pocket-shaped shaped portions 26, and the closure body can then be levered out of the drain opening 8 by means of the screwdriver.

The seal 22 makes contact with the side surface 15 of the closure body 9 both in the closed position and in the drainage position. This ensures that molten medium can only escape through the drain channel 13 in the drainage position.

The closure body 9 is designed as a hollow body, wherein the end section 11 has a cavity 23 (FIGS. 16, 18), wherein the cavity 23 is accessible from an outer side of the melting tank 2.

In the present case, the side surfaces 15 of the further section 19 also form a guide structure which, in the closed position and the drainage position, is arranged in the region of the drain opening 8. This guide structure interacts with a corresponding counter-structure 33 (FIGS. 8, 9), which is formed in the region of the drain opening 8, and serves to guide the closure body 9 axially in the longitudinal direction 31 of the lower chamber section 5. As a result, the insertion of the closure body 9 into the lower chamber section 5 or the drain opening 8 is facilitated, and the end section 11, in particular, is prevented from making contact with walls 12 and/or ribs 18 of the melting tank 2 during the process of inserting the closure body 9.

The closure body 9 is readily accessible from the outside to the user of the melter 1, wherein, in order to gain access to the closure body 9, a flap 28 (FIG. 1) of the housing 17 must be opened.

The melting tank 2, including the closure body 9, is jacketed with an insulating material (not illustrated specifically), this insulating material being, for example, an insulating mat which can contain rock wool. The insulating mat can be opened and/or detached from the melting tank 2, in particular in a region of the melting tank 2 adjoining the flap 28, in order to obtain access to the closure body 9. As a result, there is particularly good and easy access to the closure body 9, and drainage of the adhesive from the melting tank 2 is possible without problems.

In the present case, the closure body 9 can be completely removed from the melting tank 2. When the closure body 9 is completely removed, there is particularly good and easy access to the lower chamber section 5, particularly for tools for the purpose of cleaning and/or completely emptying the lower chamber section 5. The tools can be, for example, scrapers, brushes or the like, these tools preferably being adapted to the cross section of the lower chamber section 5.

The melting tank 2 is preferably a casting, wherein the lower chamber section 5 and the drain opening 8 opening into the lower chamber section 5 are formed by using a core. Because the core can be removed through the drain opening 8, the production of the casting and, in particular, of the lower chamber section 5 with the drain opening 8 is possible in a particularly simple manner. The melting tank 2 is preferably produced by means of a permanent mold casting method.

That which is claimed is:

1. A melter for preparing a molten medium having a melting tank, wherein the melting tank has a melting chamber for receiving and melting a medium to be melted, wherein the melter has a heating device for heating the melting chamber, wherein the melting chamber has an upper chamber section and a lower chamber section, wherein the melting tank has a dispensing opening, wherein the dispensing opening can be fluidly connected to a delivery device for delivering the molten medium, wherein the melting tank has a drain opening, wherein the dispensing opening and the drain opening open into the lower chamber section, wherein the melter has a closure body for closing the drain opening, and wherein, in a closed position of the closure body, the closure body closes the drain opening and an end section of the closure body projects into the lower chamber section.

2. The melter according to claim 1, wherein the melting tank has a plurality of ribs and a plurality of walls that delimit the lower chamber section, and wherein, in the closed position of the closure body, the end section is spaced apart from the walls of the melting tank and/or the ribs of the melting tank.

3. The melter according to claim 2, wherein the end section and/or the closure body consists of metal and/or an alloy, and wherein the closure body is in direct contact with at least one of the plurality of walls of the melting tank in the closed position of the closure body.

4. The melter according to claim 1, wherein, apart from the end section of the closure body, the lower chamber section is free of fittings and/or free of structures projecting into the lower chamber section.

5. The melter according to claim 1, wherein the lower chamber section is formed as a channel which is open in the direction of the upper chamber section, and wherein the drain opening opens into the channel at an end of the channel.

6. The melter according to claim 1, wherein the lower chamber section has a longitudinal extent and the end section of the closure body has a longitudinal extent, and wherein the longitudinal extent of the end section of the closure body is between 10% and 90% of the longitudinal extent of the lower chamber section.

7. The melter according to claim 1, wherein, in the closed position of the closure body, in a region in which the end section is disposed, the lower chamber section has a transverse extent and the end section of the closure body has a transverse extent, and wherein the transverse extent of the end section of the closure body is between 10% and 90% of the transverse extent of the lower chamber section.

8. The melter according to claim 2, wherein the dispensing opening and the drain opening open into the lower chamber section on different ones of the walls of the plurality of walls of the melting tank.

9. The melter according to claim 1, wherein, in the closed position of the closure body, the end section extends at least as far as the dispensing opening.

10. The melter according to claim 1, wherein the melting tank has ribs which project into the melting chamber, and wherein the ribs are interrupted in the region of the lower chamber section.

11. The melter according to claim 1, wherein the end section has a cavity which is accessible from an outer side of the melting tank.

12. The melter according to claim 1, wherein the closure body has a drain channel, and wherein, in a drainage position of the closure body, at one end the drain channel opens into the lower chamber section and at another end the drain channel opens into a region outside the melting tank.

13. The melter according to claim 12, wherein the closure body has a further section which adjoins the end section, wherein the further section has a bottom surface which faces the lower chamber section and a side surface which adjoins the bottom surface, and wherein the drain channel extends from the bottom surface to the side surface and a depression of the further section forms the drain channel.

14. The melter according to claim 1, wherein the melter has a guide body which can be arranged below the drain opening to guide away the molten medium emerging from the drain opening, and wherein the guide body can be heated and/or makes contact with a wall of the melting tank.

15. The melter according to claim 1, wherein the melting tank is formed from a casting, and wherein the lower chamber section and the drain opening that opens into the lower chamber section are formed by using a casting core.

16. The melter according to claim 6, wherein the longitudinal extent of the end section of the closure body is between 20% and 80% of the longitudinal extent of the lower chamber section.

17. The melter according to claim 16, wherein the longitudinal extent of the end section of the closure body is between 25% and 50% of the longitudinal extent of the lower chamber section.

18. The melter according to claim 7, wherein the transverse extent of the end section of the closure body is between 20% and 80% of the transverse extent of the lower chamber section.

19. The melter according to claim 18, wherein the transverse extent of the end section of the closure body is between 35% and 60% of the transverse extent of the lower chamber section.

20. The melter according to claim 19, wherein the transverse extent of the end section of the closure body is between 40% and 55% of the transverse extent of the lower chamber section.

* * * * *